(12) United States Patent
Tinghitella

(10) Patent No.: US 11,554,704 B2
(45) Date of Patent: Jan. 17, 2023

(54) HANDRAIL

(71) Applicant: John Tinghitella, Wheeling, IL (US)

(72) Inventor: John Tinghitella, Wheeling, IL (US)

(*) Notice: Subject to any disclaimer, the term of this patent is extended or adjusted under 35 U.S.C. 154(b) by 0 days.

(21) Appl. No.: 17/517,053

(22) Filed: Nov. 2, 2021

(65) Prior Publication Data
US 2022/0134930 A1 May 5, 2022

Related U.S. Application Data

(63) Continuation of application No. 63/109,139, filed on Nov. 3, 2020.

(51) Int. Cl.
*B60N 3/02* (2006.01)

(52) U.S. Cl.
CPC .............. *B60N 3/023* (2013.01); *B60N 3/026* (2013.01)

(58) Field of Classification Search
CPC .. B60N 3/023; B60N 3/026; E05B 2001/0023
USPC .................................................. 296/1.02
See application file for complete search history.

(56) References Cited

U.S. PATENT DOCUMENTS

| | | | |
|---|---|---|---|
| 4,976,455 A | 12/1990 | Brammer, Sr. et al. | |
| 6,131,979 A * | 10/2000 | McGhee ............... | B60N 3/026 296/24.3 |
| 6,843,468 B2 * | 1/2005 | Marshall ............... | A47K 3/003 256/65.16 |
| 6,974,134 B1 * | 12/2005 | Macri .................. | E05B 1/0015 16/412 |
| 7,007,366 B1 * | 3/2006 | Eby .......................... | B60P 3/36 29/434 |
| 7,249,395 B2 | 7/2007 | Brammer, Jr. et al. | |
| 8,567,014 B1 * | 10/2013 | Huang .................... | B25G 1/06 16/405 |
| 10,457,182 B2 * | 10/2019 | McKinnon ............. | B60N 3/026 |
| 10,925,446 B2 * | 2/2021 | Edwards .............. | A47K 17/024 |
| 10,946,780 B2 * | 3/2021 | Bacon .................. | E05B 1/0015 |
| D915,174 S * | 4/2021 | Murphy ................... | D23/304 |
| 11,046,226 B1 * | 6/2021 | Younce ................. | B60N 3/023 |
| 2007/0204437 A1 * | 9/2007 | Hartmann, Jr. ....... | B60N 3/023 16/444 |
| 2014/0007381 A1 * | 1/2014 | Huang ................. | A47B 95/02 16/421 |
| 2017/0182919 A1 * | 6/2017 | McKinnon ............. | B60N 3/026 |
| 2022/0134930 A1 * | 5/2022 | Tinghitella ............ | B60N 3/026 296/1.02 |
| 2022/0289091 A1 * | 9/2022 | Sakurai .................. | B60J 5/062 |

* cited by examiner

*Primary Examiner* — Jason S Morrow

(74) *Attorney, Agent, or Firm* — James E. Brunton

(57) ABSTRACT

A novel handrail that can be mounted on the side of a recreational vehicle proximate an access door that can be safely grasped by the user to assist in entering or exiting the interior of the vehicle.

20 Claims, 14 Drawing Sheets

HANDRAIL

CROSS-REFERENCE TO RELATED APPLICATIONS

This is a Non-Provisional Application claiming the benefit of Provisional Application No. 63/109,139 filed Nov. 3, 2020.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to handrails for use in opening and closing doors. More particularly, the invention concerns a novel handrail that can be mounted on the side of a recreational vehicle proximate an access door that can be safely grasped by the user to assist in entering or exiting the interior of the vehicle.

Discussion of the Prior Art

Recreational vehicles of all types generally have interior areas that are accessible from the exterior of the vehicle by means of doors mounted on an exterior vertical wall. As a general rule, the handrail is affixed to the side of the vehicle proximate the access door and extends outwardly so as to permit a person to grasp the handrail as they are entering or exiting recreational vehicle. In some instances, due to the mobility of the recreational vehicle, the handrail is removably mounted from its mounting brackets to avoid interference with travel of the vehicle. In other instances, the handrail is swingably movable relative to its mounting brackets from an outwardly extending position into a folded position proximate the side of the vehicle. Exemplary of these prior art handrails are the handrail constructions illustrated and described in U.S. Pat. No. 4,976,455 issued to Brammer Sr. et al. and U.S. Pat. No. 7,249,395 issued to Brammer Jr. et al. With regard to the removable handrail type devices, this approach tends to be cumbersome and time-consuming and undesirably necessitates providing storage space within the vehicle to stow the handrail during travel of the vehicle. The prior art swingably mounted handrail approach typically involves the lifting of the handrail relative to its mounting brackets to enable the handrail to be pivoted relative to its brackets. This prior art approach can be hazardous and possibly cause injury to the user because, if the handrail is accidentally lifted while entering or exiting the vehicle, the handrail can unexpectedly and undesirably move into the folded position possibly causing the user to lose his or her balance and fall. A primary objective of the present invention is to provide a handrail assembly that is of unique design and successfully avoids these prior art drawbacks.

SUMMARY OF THE INVENTION

It is an object of the present invention to provide a handrail assembly of unique design that can be affixed to the side of a recreational vehicle in a manner that will permit a person to safely grasp the handrail as they are entering or exiting the recreational vehicle.

Another object of the invention is to provide a handrail assembly of the aforementioned character that can easily be moved from an outwardly extending, operational position to a stowed position adjacent to the side of the vehicle.

Another object of the invention is to provide a handrail assembly that can be positively locked either in an operative position or in a storage position and cannot be unlocked by the lifting or other manipulation of the handrail.

Another object of the invention is to provide a handrail assembly as described in the preceding paragraph that is provided with a hand operated release tab that can be readily operated by the user to release the handrail from either of its locked positions.

Another object of the invention is to provide a handrail assembly as described in which the handrail is interconnected with upper and lower brackets using operational components of the same configuration. However, the locking component is of a unique design so that it can be used in the upper bracket in a first position and in the lower bracket in an inverted position.

A further objective of the invention is to provide a handrail assembly that is safe to use, is highly reliable in operation and is easy to use and to install.

DESCRIPTION OF THE INVENTION

Figure 1:
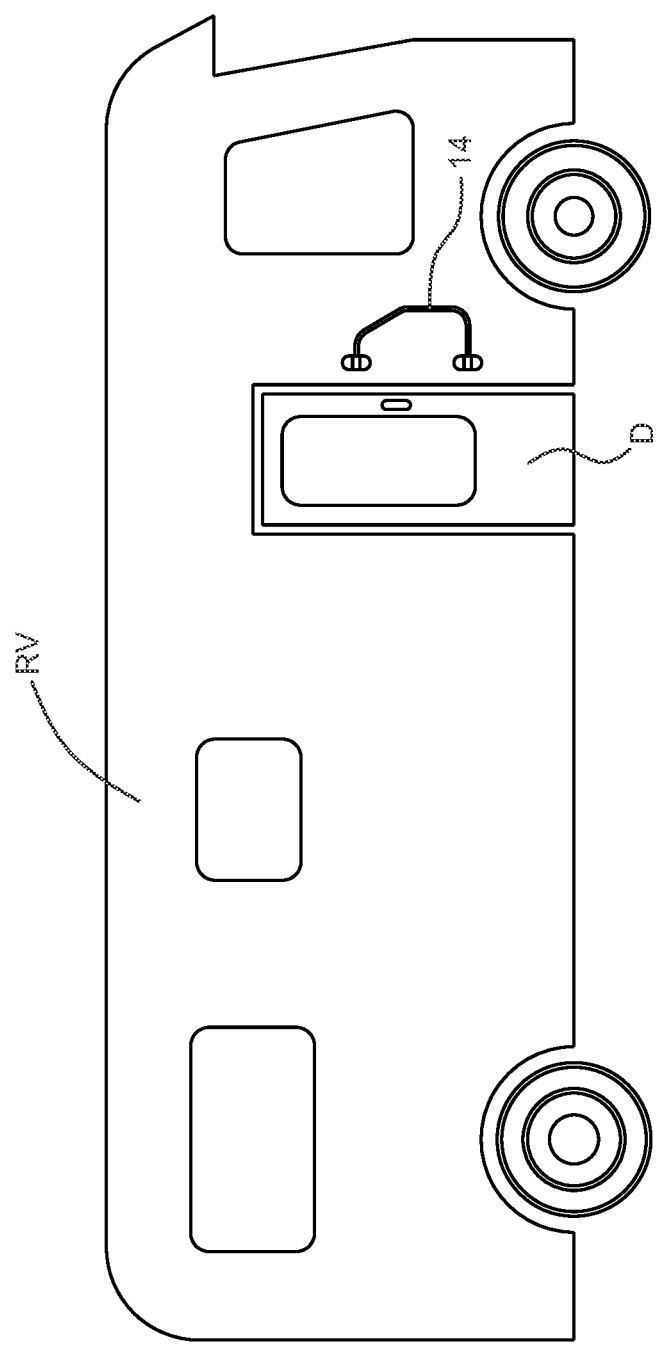
FIG. 1 is a generally perspective view of one form of the handrail assembly of the invention as it appears when affixed to the side of a recreational vehicle.
Figure 4:
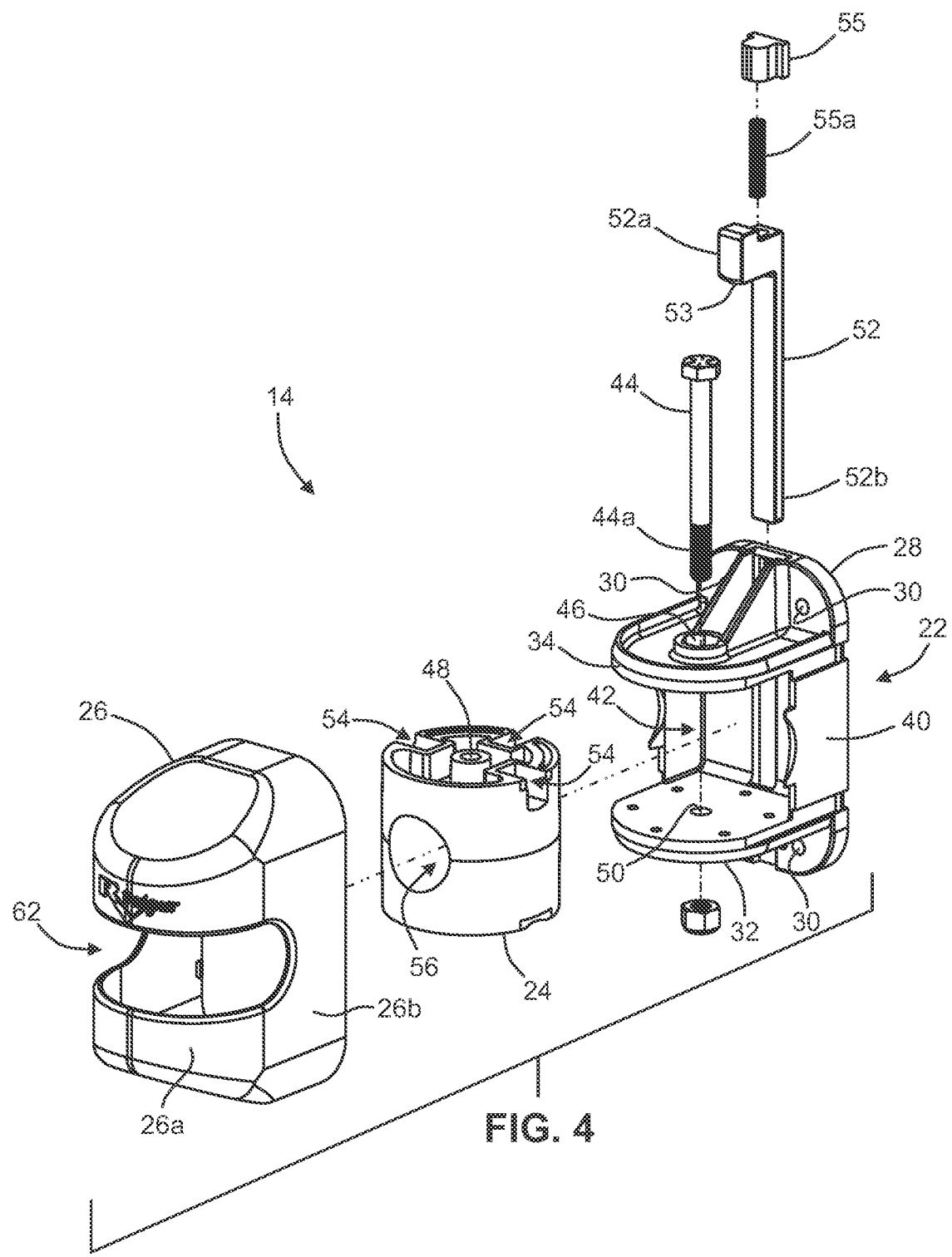
FIG. 4 is a cross-sectional view taken along lines 4-4 of FIG. 3.
Figure 5:
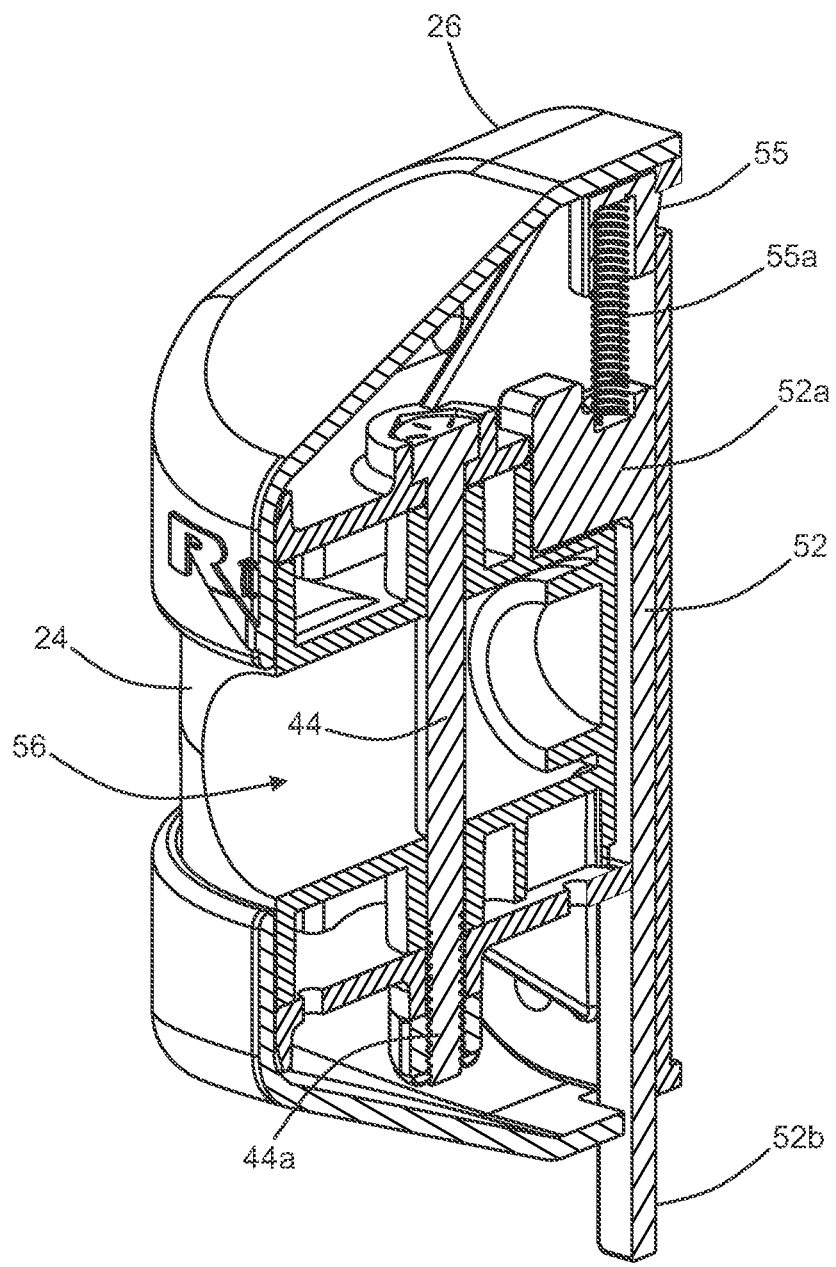
FIG. 5 is a cross-sectional view similar to FIG. 4, but showing the handrail connected to the bracket component.

Referring to the drawings and particularly to FIGS. 1-4, one form of the handrail assembly of the invention is there shown and generally designated by the numeral 14. As shown in FIG. 1, the handrail assembly is mounted on the side of the recreational vehicle "RV" proximate the hingeably mounted door "D". In the present form of the invention, the handrail assembly 14 comprises an elongate hand rail 16 having a first end 16a and second end 16b. Attached to the first end 16a is a first bracket 18 and attached to the second end 16b is a second bracket 20 (see FIG. 2). As best seen in FIG. 4 of the drawings, first bracket 18 includes a mounting component 22, a locking component 24 and a housing 26 that, as illustrated in FIG. 5 encompasses the locking component and the mounting component.

Figure 8:
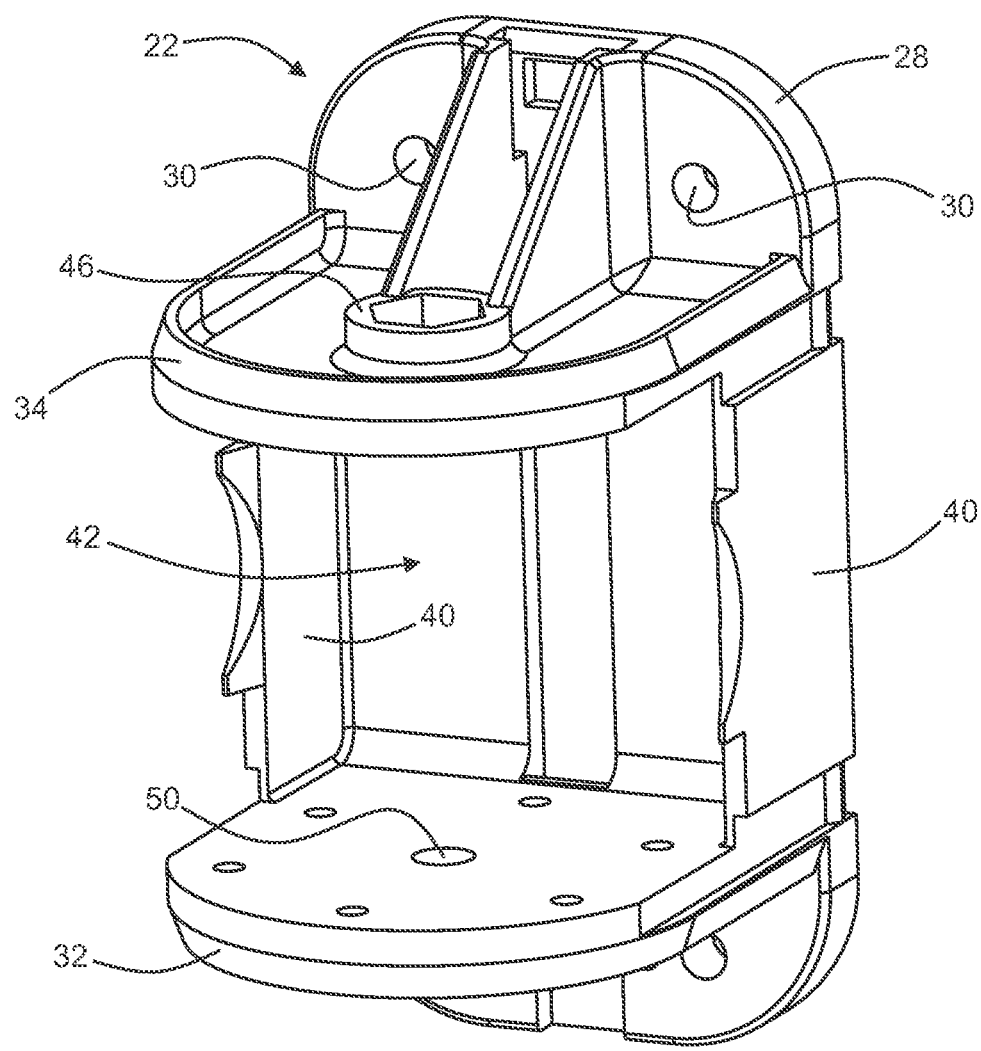
FIG. 8 is a generally perspective view of the of the locking component and release tab component of the bracket shown in FIG. 3.
Figure 9:
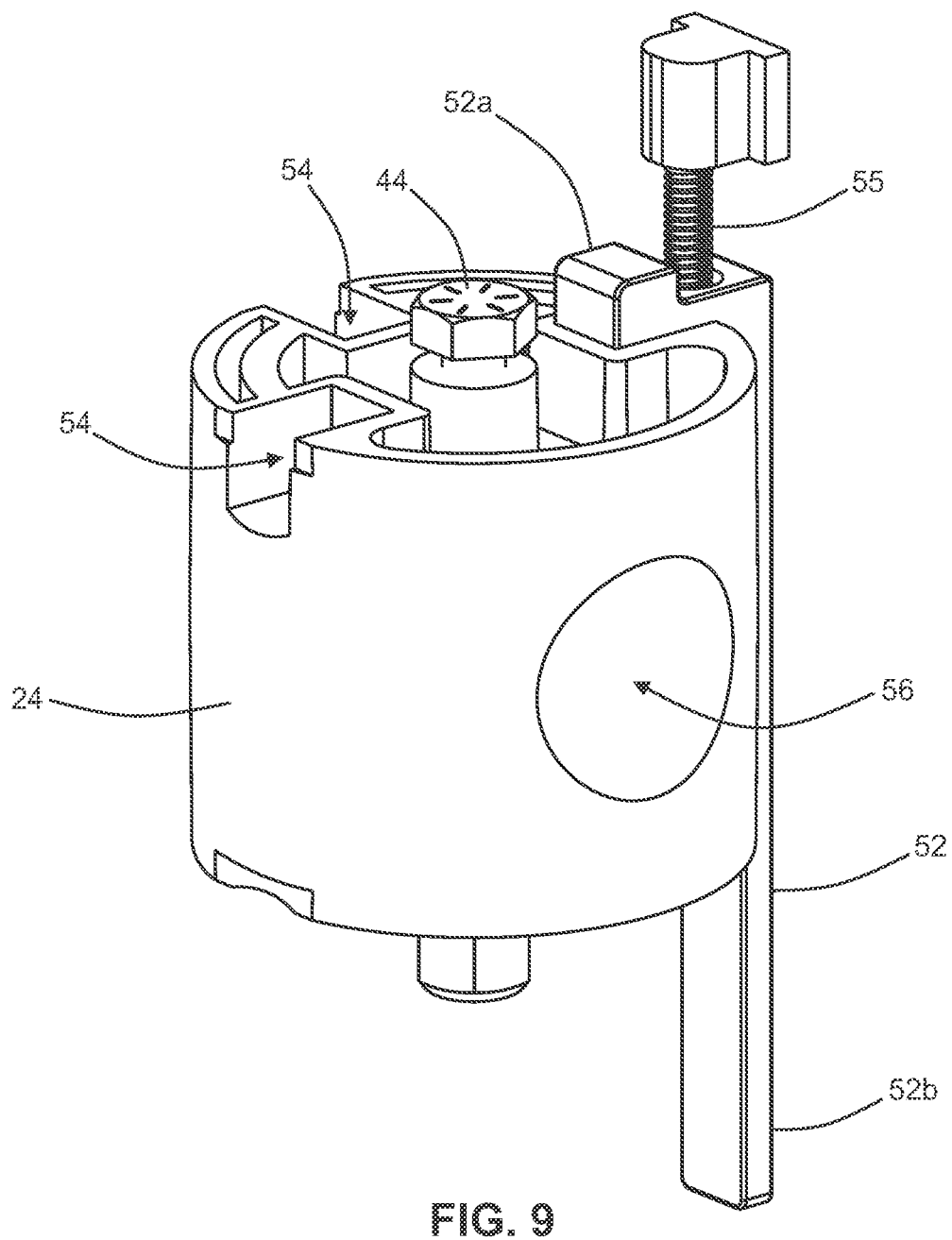
FIG. 9 is a generally perspective top view of the of the locking component of the bracket shown in FIG. 3.
Figure 10:
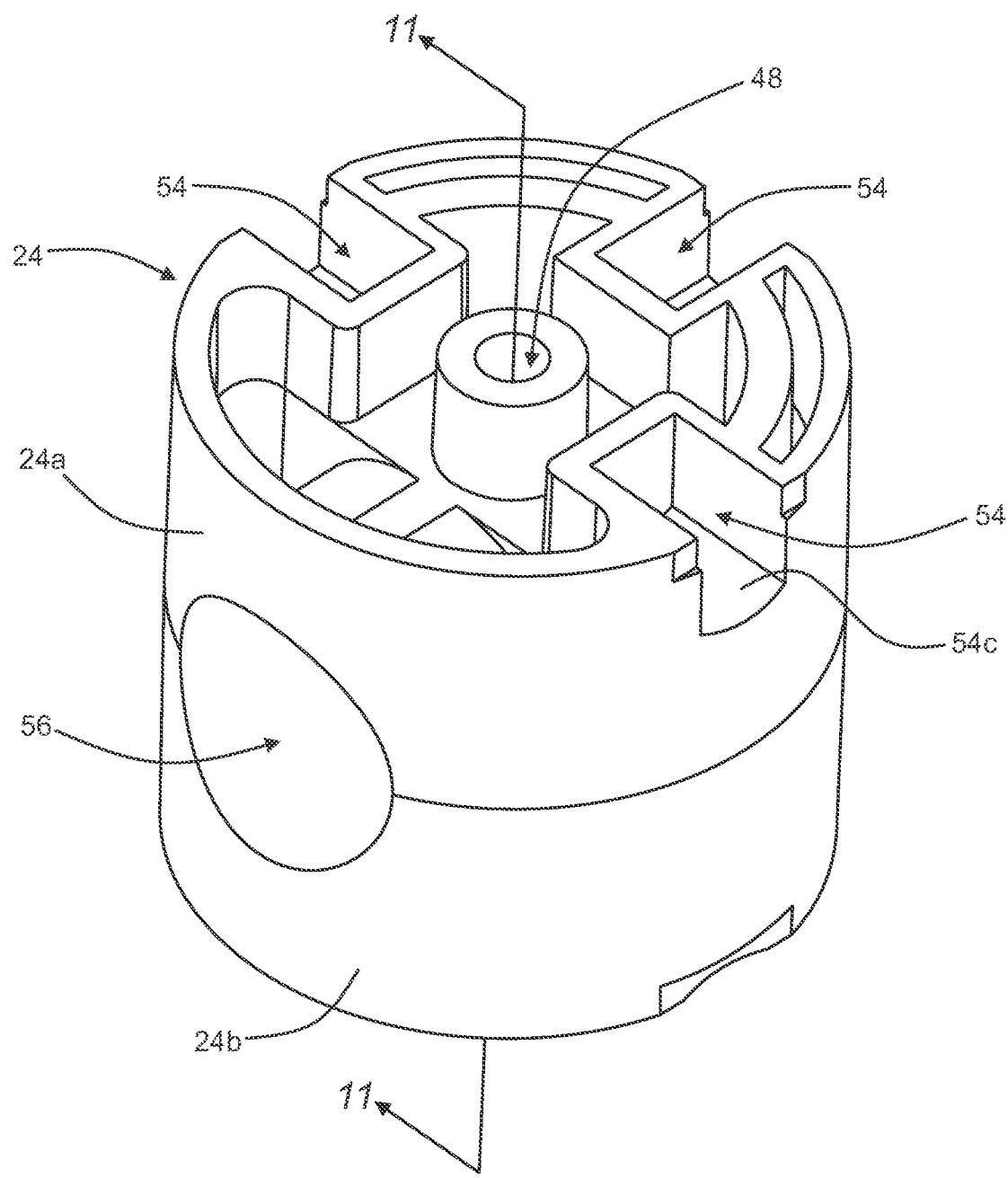
FIG. 10 is a cross-sectional view taken along lines 10-10 of FIG. 9.
Figure 14:
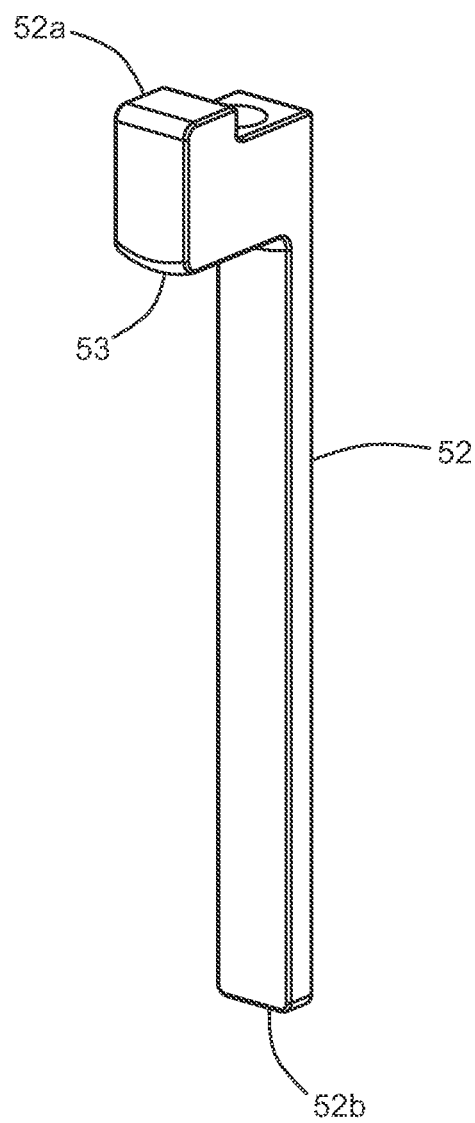
FIG. 14 is a greatly enlarged, generally perspective view of one form of the downwardly extending release tab component of the bracket component shown in FIG. 3.

As illustrated in FIG. 8 of the drawings, mounting component 22 includes a mounting plate 28 that can be affixed to the side of the recreational vehicle using conventional connectors (not shown) that are receivable within four spaced apart apertures 30 provided in the sides of the mounting plate. Extending outwardly from mounting plate 28 is a base 32 and an upper platform 34. That, along with side skirts 40, define an internal chamber 42 within which the locking component 24 is rotatably mounted. Locking component 24 is held in position within chamber 42 by an elongated threaded connector 44 that is receivable within an aperture 46 provided in platform 34 and extends through a central passageway 48 formed in a locking plate. The threaded extremity 44a of connector 44 is threadably received within a threaded aperture 50 provided in base 32. Slidably connected to the mounting component is a downwardly extending non key operated release tab 52 that has a head portion 52a and a tail portion 52b. For a reason presently to be described, head portion 52a has a curved lower surface 53 (see FIG. 14). As illustrated in FIG. 10, locking component 24 includes an upper portion 24a that is provided with a plurality of circumferentially spaced apart slots 54 and a lower detent portion 24b. As will be discussed in greater detail in the paragraphs that follow, release tab 52 is adapted for movement between a first position wherein the curved head portion 52a of the release tab resides within a selected one of the circumferentially spaced locking slots 54 of the first bracket and a second release position wherein the head portion of the release tab resides within another of the circumferentially spaced locking slots 54 of the first bracket. Each of the locking slots 54 is provided with a curved lower surface 54c which mateably engages the curved head portion of the release tab (see FIG. 10).

Figure 11:
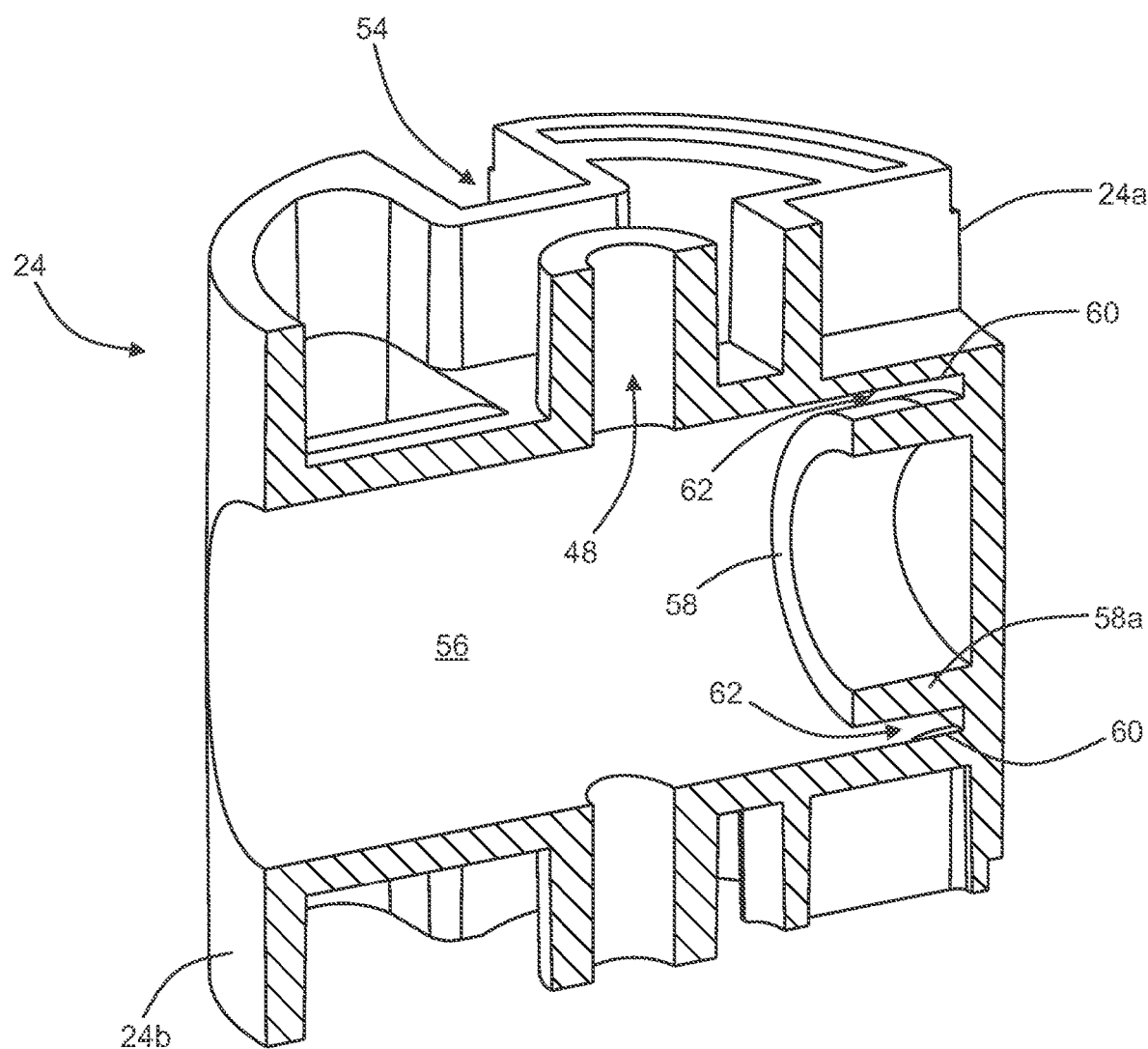
FIG. 11 is a generally perspective view of the of the housing component of the bracket shown in FIG. 3.
Figure 12:
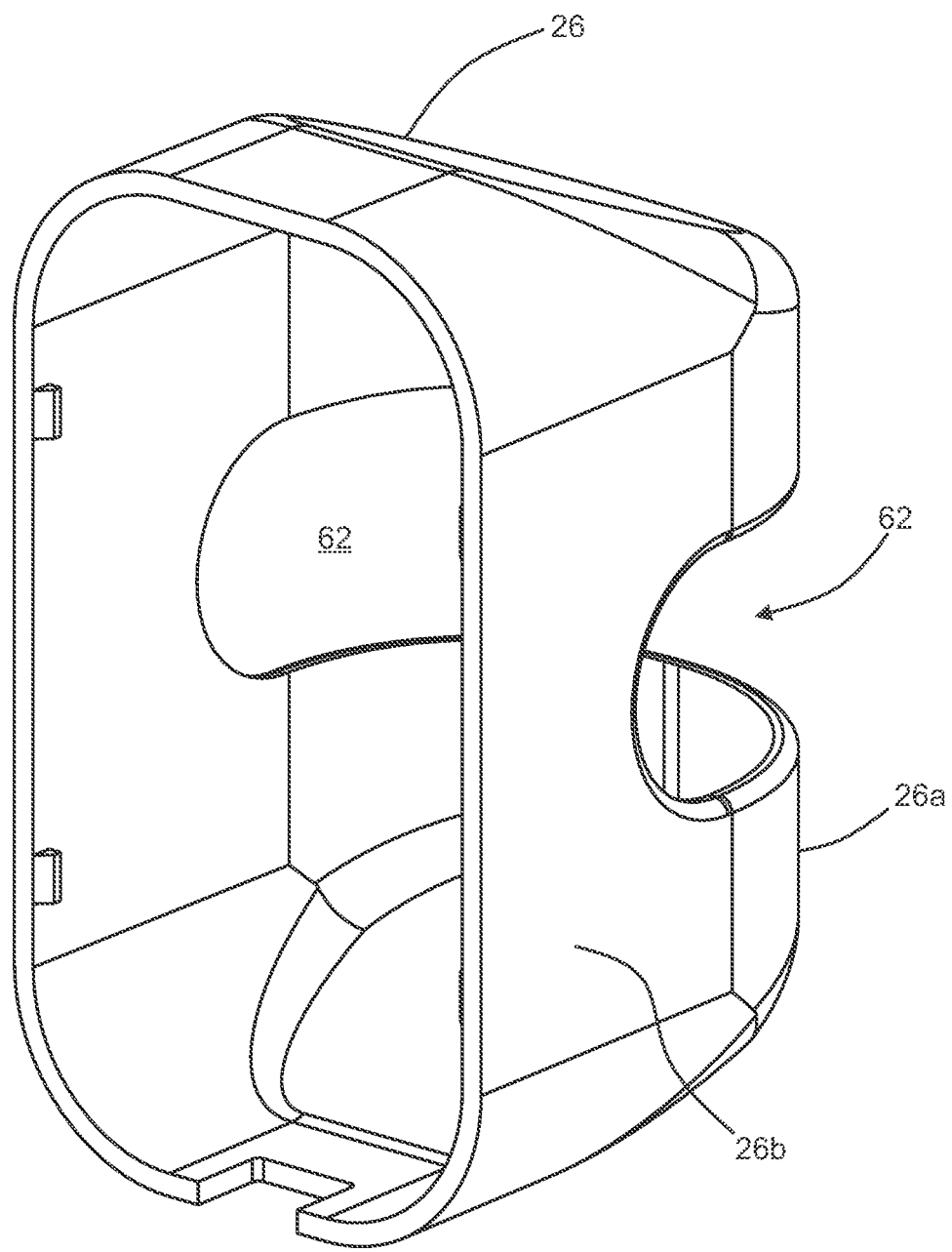
FIG. 12 is a generally perspective, exploded view of the of the bracket component shown in FIG. 3.

Connected to mounting component 22 is a spring holder 55 that strategically positions a coiled spring 55a which functions to bias the release tab downwardly into the locking slots 54. For a purpose presently to be described, locking component 24 is also provided with a centrally located transverse bore 56. As best seen in FIG. 11 of the drawings, bore 56 is open at one end and closed at the other end by a handrail connector structure 58. The closed end of bore 56 is provided with a tapered segment 60 which, along with the skirt 58a of the connector structure, defines a slot 62 that closely receives the end portion of the handrail in the manner illustrated in FIG. 6 of the drawings.

Surrounding locking component 24 and connector component 22 is the previously mentioned cover component 26. Aligned with transverse bore 56 is a circumferentially extending guide opening 62 that is formed in the front face 26a of the housing and a portion of the sides 26b of the housing (see FIG. 4). When the end of the handrail is held in position within the brackets by the connector structure 58 in the manner shown in FIG. 6, the end portion of the handrail is disposed within opening 62 and is free to move circumferentially within the opening as the locking component 24 rotates within chamber 42 (see FIG. 2).

Figure 2:
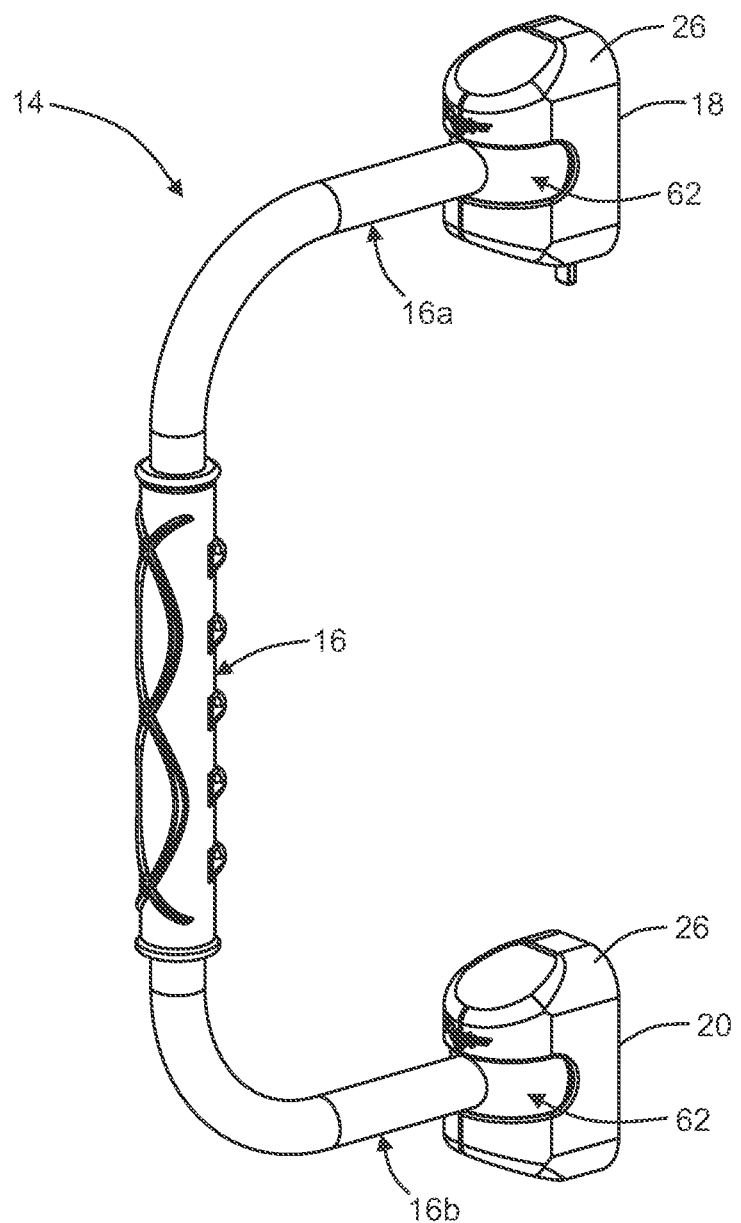
FIG. 2 is a greatly enlarged, generally perspective view of one form of the handrail assembly of the invention.
Figure 3:
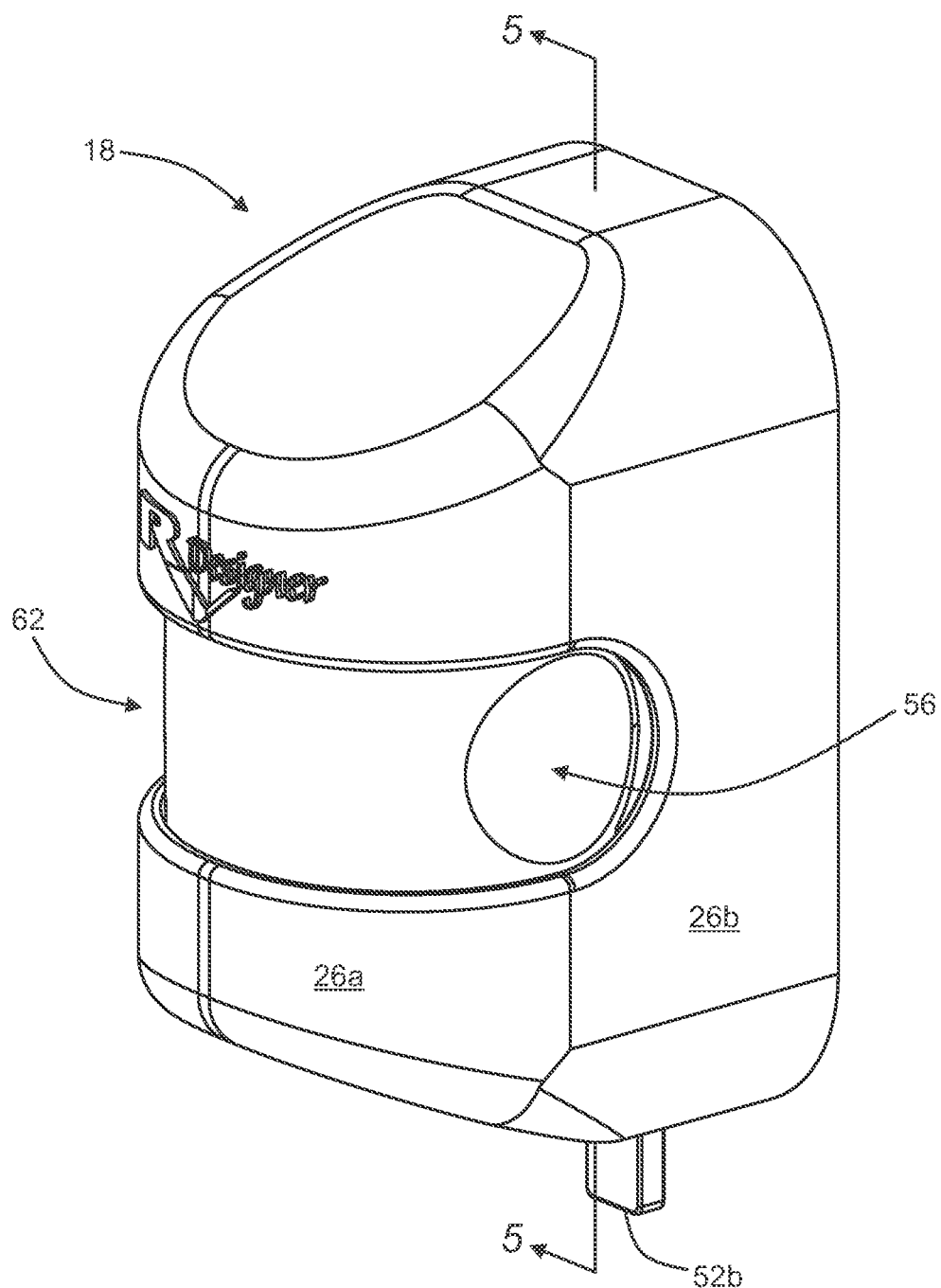
FIG. 3 is a generally perspective view of one form of the bracket component of the handrail assembly.
Figure 13:
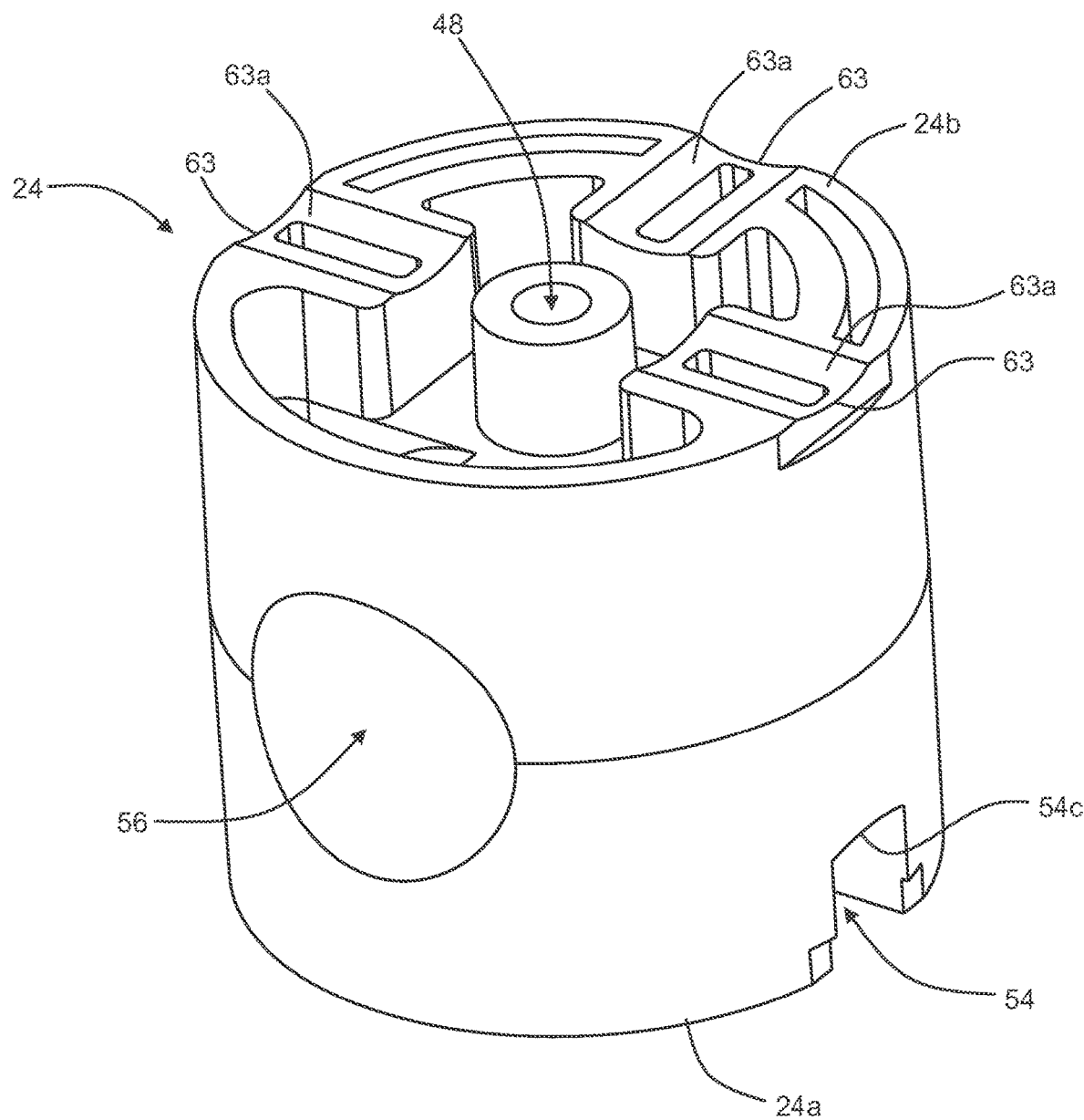
FIG. 13 is a generally perspective bottom view of the of the locking component of the bracket shown in FIG. 3.

Turning now to a consideration of the second bracket 20, which is affixed to end 16b of the handrail 16 (FIG. 2). Bracket 20 is similar in most respects to first bracket 18 and like numerals are used in the drawings to identify like components. As is the case with first bracket 18, second bracket 20 includes a mounting component 22, a locking component 24 and a housing 26. However, when the locking component 24 is rotatably mounted within chamber 42 of the mounting component, it is inverted so that: the detent portion 24b of the component is on top and the surface having the plurality of circumferentially spaced apart slots 54 is on the bottom (see FIG. 13). As illustrated in FIG. 13, the detent portion 24b includes a plurality of circumferentially spaced apart concave detents 63. As in the first bracket 18, a downwardly extending release tab 52 having a head portion 52a and a tail portion 52b is slidably connected to the mounting component 22.

Figure 6:
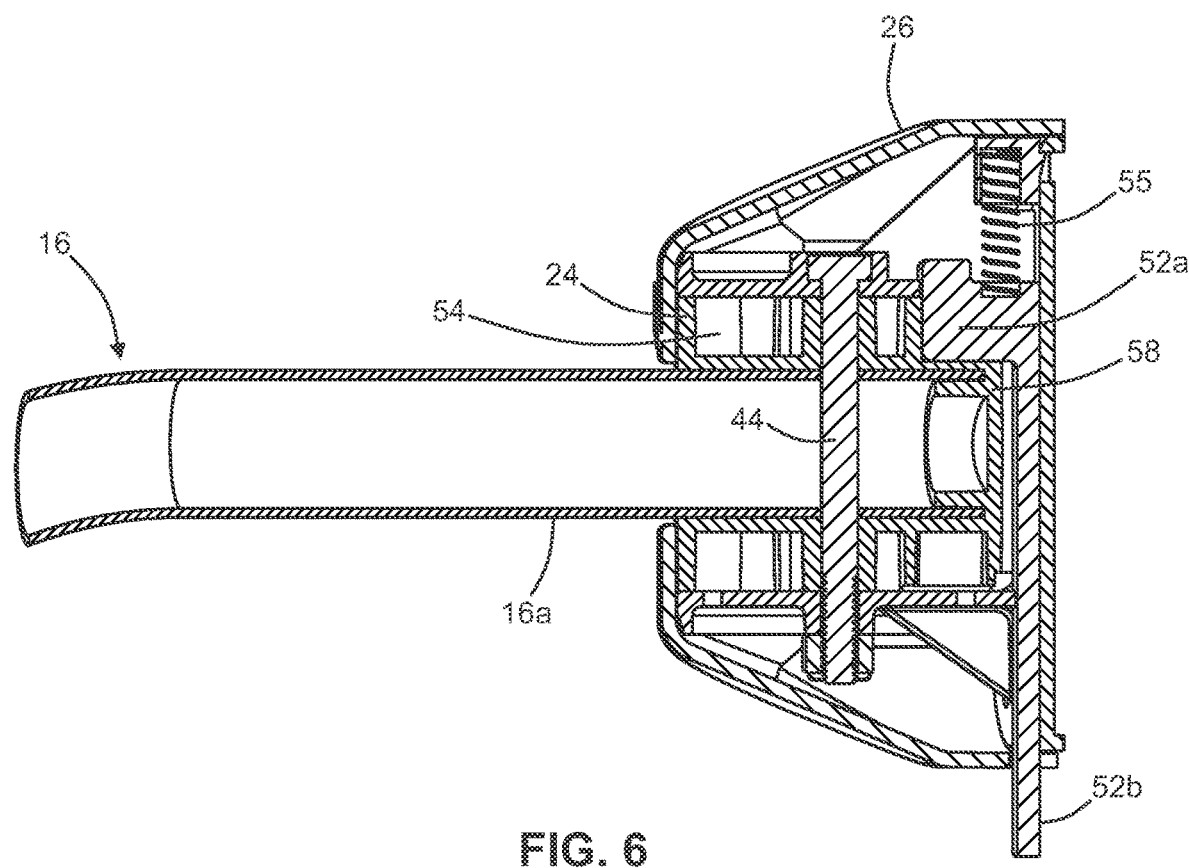
FIG. 6 is a generally perspective view of the bracket component shown, in FIG. 3 as it appears with the housing portion of the bracket removed.
Figure 7:
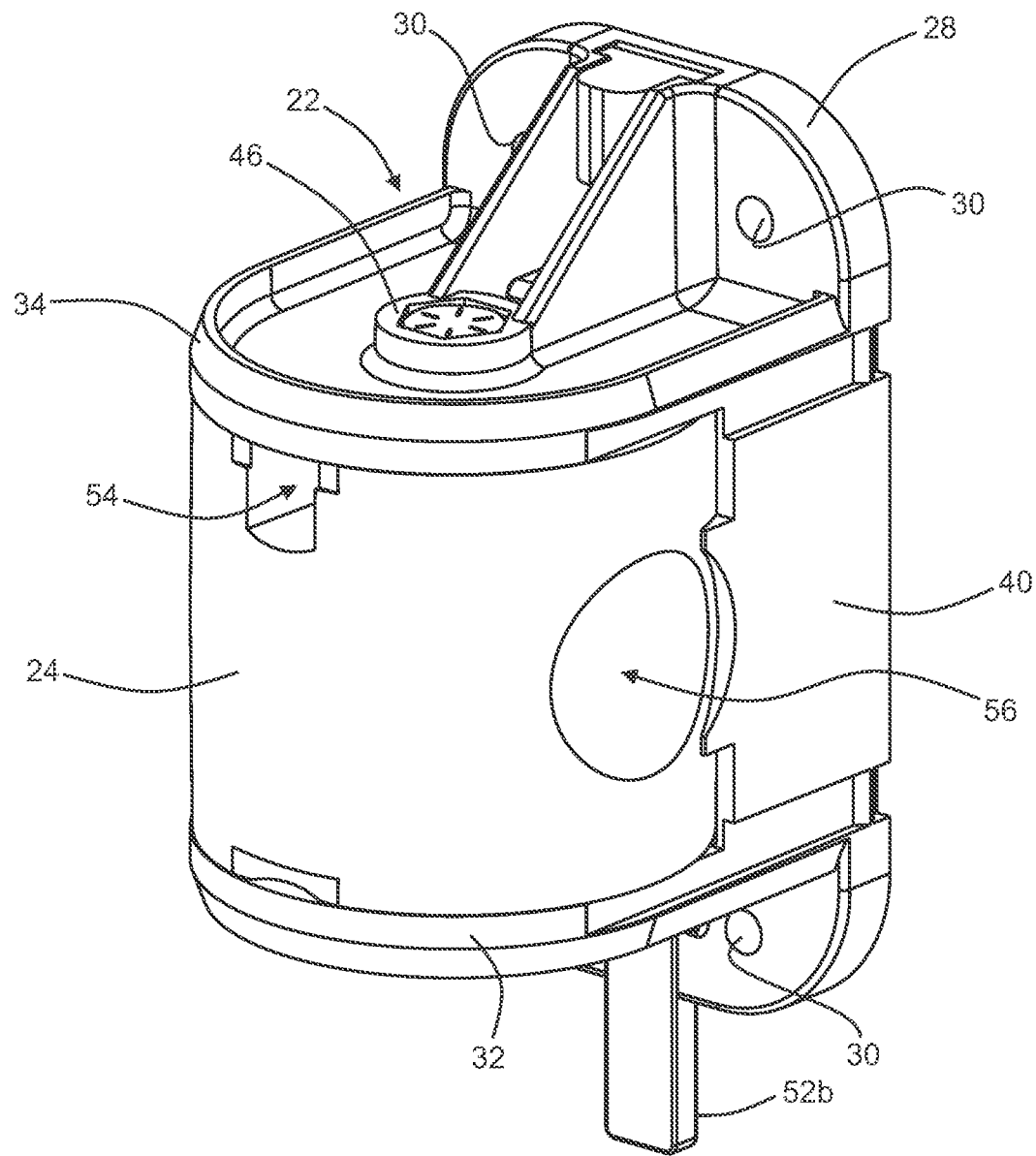
FIG. 7 is a generally perspective view of the mounting component of the bracket shown in FIG. 3.

In using the handrail assembly of the invention, end 16a of the handrail is inserted into handrail connector structure 58 of the upper bracket 18 in the manner shown in FIG. 6 of the drawings. Similarly, end 16b of the handrail is inserted into the connector structure 58 of the inverted locking component 24 of the lower bracket 20. Prior to moving the housings 26 into position over the locking components, both the upper and lower brackets are connected to the side of the recreational vehicle using appropriate connectors that extend through openings 30 of the mounting plates 28. With the handle 16 interconnected with upper and lower brackets and extending outwardly in the manner shown in FIG. 2 of the drawings, it is to be noted that the head portion 52a of the release tab 52 of the upper bracket assembly 18 is seated within the central locking slot 54 of the locking component 24 and the head portion 52a of the release tab 52 of the lower bracket assembly 20 is seated within the central detent 63 of the inverted locking component 24 (see FIG. 13). When it is desired to move the handrail from the locked, outwardly extending position shown in FIGS. 1 and 2 of the drawings into a folded configuration wherein the handrail is locked in a position proximate the side of the recreational vehicle, the head portion 52a of the release tab must be removed from the locking slot 54 of the locking component. This is done by pushing upwardly on end 52b of the release tab against the urging of coil spring 55a. When the head portion 52a of the release tab clears the slot within which it is seated, the locking component 24 is free to rotate within chamber 42 by simply pushing on the handrail in a manner to cause the ends of the handrail to smoothly travel along the guides 62 provided in the cover components 26. As the locking component 24 rotates, the lower end 52b of the release tab of the upper bracket 18 will, due to the urging of spring 55a, resent within the next adjacent locking slot 54 of the locking component. Similarly, as a locking component 24 rotates, the lower end 52b of the release tab of the lower bracket 20 will slide smoothly out of the detent 63 within which it was seated and will reseat within the next adjacent detent 63.

When it is desired to move the handrail from the folded configuration into the outwardly extending, the release tab must be removed from the locking slot 54 of the locking component in which it resides. Once again, this is done by pushing upwardly on end 52b of the release tab against the urging of coil spring 55a. When the head portion 52a of the release tab clears the slot within which it is seated, the locking component 24 is free to rotate within chamber 42 by once again pushing on the handrail in a manner to cause the ends of the handrail to smoothly travel along the guides 62 provided in the cover components 26. As the locking component 24 rotates, the lower end 52b of the release tab of the upper bracket 18 will, due to the urging of spring 55*a*, once again reseat within the central locking slot 54 of the locking component. Similarly, as a locking component 24 rotates, the lower end 52*b* of the release tab of the lower bracket 20 will slide smoothly out of the detent 63 within which it was seated and will reseat within the next adjacent detent 63.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A handrail assembly comprising:
   (a) an elongate handrail having a first end and a second end;
   (b) a first bracket connected to said first end of said elongate rail, said first bracket having:
      (i) a mounting component;
      (ii) a generally cylindrical shaped locking component rotatably connected to said mounting component, said generally cylindrical shaped locking component having a handrail receiving bore and an upper rim having a plurality of circumferentially spaced locking slots;
      (iii) a non key operated release tab connected to said mounting component for movement between a first position and a second position, said release tab including a head portion receivable within a selected one of said circumferentially spaced locking slots of said upper rim of said locking component when said release tab is in said first position; and
   (c) a second bracket connected to said second end of said elongate rail.

2. The handrail assembly as defined in claim 1 further including a coil spring connected to said mounting component, said coil spring being operably associated with said release tab for urging against movement of said release tab from said first position to said second position.

3. The handrail assembly as defined in claim 1 further including a housing connected to said mounting component for encompassing said locking component and a portion of said mounting component.

4. The handrail assembly as defined in claim 1 in which said second bracket includes a mounting component and an inverted locking component rotatably connected to said mounting component.

5. The handrail assembly as defined in claim 4 in which said inverted locking component includes an upper detent portion and a lower portion provided with a plurality of circumferentially spaced locking slots.

6. The handrail assembly as defined in claim 4 in which said inverted locking component includes a handrail receiving bore for receiving said elongate rail.

7. The handrail assembly as defined in claim 4 further including a housing connected to said mounting component of said second bracket.

8. The handrail assembly as defined in claim 7 in which said housing connected to said mounting component of said second bracket includes a circumferentially extending guide.

9. The handrail assembly as defined in claim 7 further including a release tab connected to said mounting component of said second bracket for movement between a first position and a second position, said release tab including a head portion and a tail portion.

10. A handrail assembly comprising:
    (a) an elongate handrail having first and second ends;
    (b) a first bracket connected to said first end of said elongate rail, said first bracket having:
       (i) a mounting component;
       (ii) a locking component rotatably connected to said mounting component, said locking component including an upper portion provided with a plurality of circumferentially spaced locking slots and a lower decent portion; and
       (iii) a housing encompassing said locking component and a portion of said mounting component;
    c) a downwardly extending release tab having a head portion and a tail portion, said release tab being slidably connected to said mounting component of said first bracket for movement between a first position wherein said head portion of said release tab resides within a selected one of said circumferentially spaced locking slots of said first bracket and a second release position; and
    d) a second bracket connected to said second end of said elongate rail, said second bracket having:
       (i) a mounting component;
       (ii) a generally cylindrical shaped locking component rotatably connected to said mounting component of said second bracket, said locking component of said second bracket having an upper detent portion and a lower portion provided with a plurality of circumferentially spaced locking slots; and
       (iii) a housing encompassing said locking component and a portion of said mounting component.

11. The handrail assembly as defined in claim 10 in which said housing of said first bracket includes a circumferentially extending guide.

12. The handrail assembly as defined in claim 10 in which said mounting component of said first bracket further includes an upper platform having an aperture and a threaded connector receivable within said aperture.

13. The handrail assembly as defined in claim 12 in which said mounting component of said first bracket further includes a base having a threaded aperture for receiving said threaded connector.

14. The handrail assembly as defined in claim 12 in which said locking component of said first bracket includes a transverse bore for receiving said elongate rail.

15. The handrail assembly as defined in claim 14 in which said transverse bore of said locking component of said first bracket is open at one end and closed at the other end.

16. A handrail assembly comprising:
    (a) an elongate handrail having first and second ends;
    (b) a first bracket connected to said first end of said elongate rail, said first bracket having:
       (i) a mounting component;
       (ii) a locking component rotatably connected to said mounting component, said locking component including an upper portion provided with a plurality of circumferentially spaced locking slots and a lower decent portion;
       (iii) a housing encompassing said locking component and a portion of said mounting component, said housing, having a circumferentially extending guide;
       (iv) a downwardly extending release tab having a head portion and a tail portion, said release tab being slidably connected to said mounting component of said first bracket for movement between a first position wherein said head portion of said release tab resides within a selected one of said circumferentially spaced locking slots of said first bracket and a second release position; and
(c) a second bracket connected to said second end of said elongate rail, said second bracket having:
(i) a mounting component;
(ii) a generally cylindrical shaped locking component rotatably connected to said mounting component of said second bracket, said locking component including;
   a. lower portion provided with a plurality of circumferentially spaced locking slots and an upper decent portion; and
   b. a transverse bore for receiving said elongate rail;
(iii) a housing encompassing said locking component of said second bracket and a portion of said mounting component of said second bracket, said housing having a circumferentially extending guide.

17. The handrail assembly as defined in claim 16 in which said locking component of said first bracket includes a transverse bore for receiving said elongate rail.

18. The handrail assembly as defined in claim 17 in which said transverse bore of said locking component of said first bracket is open at one end and enclosed at the other end.

19. The handrail assembly as defined in claim 16 in which said mounting component of said second bracket further includes an upper platform having an aperture and a threaded connector receivable within said aperture.

20. The handrail assembly as defined in claim 16 in which said mounting component of said second bracket further includes a base having a threaded aperture for receiving said threaded connector.

\* \* \* \* \*